US006967329B2

(12) United States Patent
Sipilä et al.

(10) Patent No.: US 6,967,329 B2
(45) Date of Patent: Nov. 22, 2005

(54) RADIATION DETECTOR, ARRANGEMENT AND METHOD FOR MEASURING RADIOACTIVE RADIATION, WHERE CONTINUOUS LOW-ENERGY BACKGROUND NOISE IS REDUCED

(75) Inventors: Heikki Johannes Sipilä, Espoo (FI); Erkki Sakari Kiuru, Espoo (FI)

(73) Assignee: Oxford Instruments Analytical Oy, Espoo (FI)

( * ) Notice: Subject to any disclaimer, the term of this patent is extended or adjusted under 35 U.S.C. 154(b) by 316 days.

(21) Appl. No.: 10/308,303

(22) Filed: Dec. 3, 2002

(65) Prior Publication Data
US 2003/0138075 A1  Jul. 24, 2003

(30) Foreign Application Priority Data
Dec. 18, 2001  (FI) ................................. 20012493

(51) Int. Cl.[7] ............................................ G01T 1/185
(52) U.S. Cl. .............................. 250/339.13; 250/370.06
(58) Field of Search ...................... 250/339.13, 370.06, 250/370.01, 370.09, 336.1, 370.11, 370.12, 250/371, 389, 486.1, 367

(56) References Cited

U.S. PATENT DOCUMENTS

| 3,514,602 | A  |   | 5/1970  | Rhodes |
| 3,843,884 | A  | * | 10/1974 | Evans ............................ 378/50 |
| 4,047,041 | A  |   | 9/1977  | Houston |
| 4,376,892 | A  | * | 3/1983  | Charpak et al. ............. 250/372 |
| 4,485,307 | A  | * | 11/1984 | Osborne et al. .......... 250/385.1 |
| 6,069,360 | A  | * | 5/2000  | Lund ...................... 250/370.01 |
| 6,452,184 | B1 | * | 9/2002  | Taskar et al. ................ 250/367 |
| 6,781,132 | B2 | * | 8/2004  | McGregor .............. 250/370.09 |
| 2003/0034456 | A1 | * | 2/2003 | McGregor ............. 250/370.09 |

* cited by examiner

Primary Examiner—Otilia Gabor
(74) Attorney, Agent, or Firm—Wood, Phillips, Katz, Clark & Mortimer

(57) ABSTRACT

The invention relates to a radiation detector, an arrangement and a method for an energy-dispersive detection of X-ray photons. X-ray photons are allowed to collide (701) in the radiation detector (201, 601), whereby there are produced (702, 703, 704, 705, 706, 707, 708) observations of the X-ray photons that collided in the detector. According to the invention, there are separately produced observations of X-ray photons (702, 703, 704) that collided in the first detector space (205, 501) of the radiation detector and X-ray photons (705, 706, 707, 708) that collided in the second detector space (206, 502) of the radiation detector. The (712) observations of X-ray photons that collided in the first detector space (205, 501) are ignored, when there is received a simultaneous observation of an X-ray photon that collided in the second detector space.

12 Claims, 5 Drawing Sheets

Figure 1:
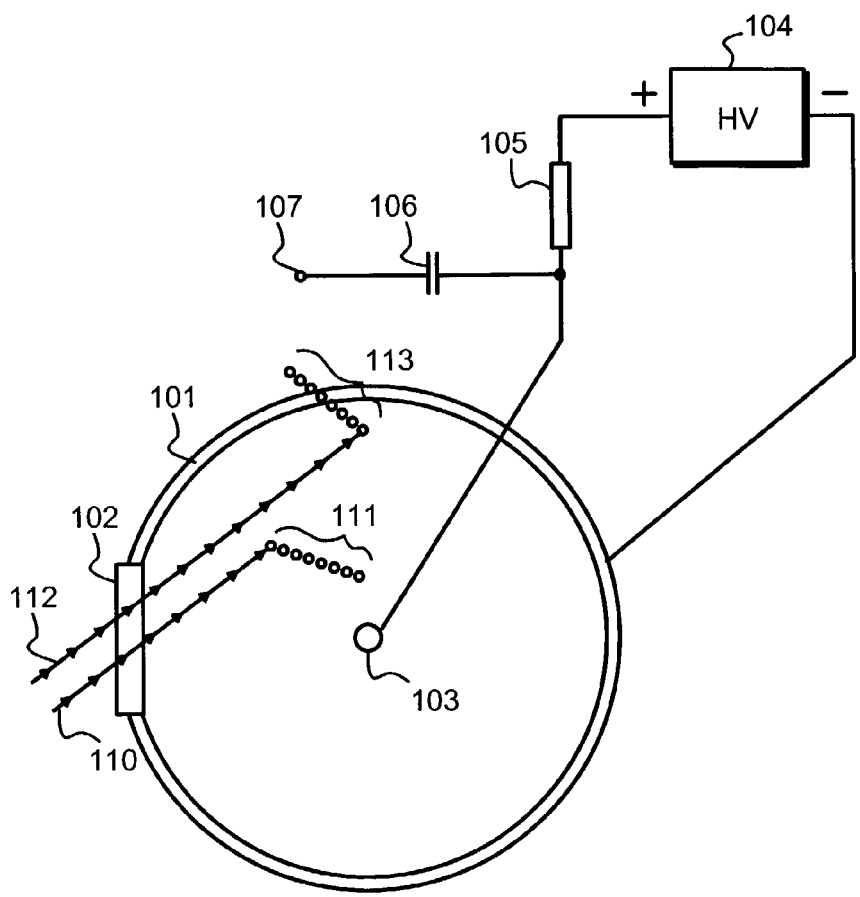

RADIATION DETECTOR, ARRANGEMENT AND METHOD FOR MEASURING RADIOACTIVE RADIATION, WHERE CONTINUOUS LOW-ENERGY BACKGROUND NOISE IS REDUCED

In general, the invention relates to radioactive radiation detectors based on gas ionization. In particular, the invention relates to how the signal to noise ratio of this type of detector can be improved by reducing low-energy background noise.

X-ray fluorescence methods are generally used when analyzing the contents of given substances in an obtained sample. In the analysis, there is used a radiation source that emits X-ray-frequency radiation, so-called excitation radiation; said excitation radiation is allowed to collide in the sample, so that it excites the atoms contained in the sample. When the excited state is relaxed, the sample emits fluorescence radiation. The excited state corresponds to the amount of energy that is specific for the atoms of each element. By measuring the spectrum of fluorescence radiation, it is possible to find out the ingredients of the sample and the contents of various elements in the sample.

When measuring fluorescence radiation, the key factor is a detector that converts the collided radiation photons into electric signals. The detector must be energy-dispersive, which means that per each collided radiation photon, it must give a signal that indicates the energy of the photon in question. Known types of energy-dispersive radiation detectors are for example gas-filled ionization chambers and proportional counters as well as semiconductor detectors. In particular, the present invention relates to gas-filled detectors, where the radiation photon collided with the detector generates in the medium (gas) a number of positive and negative charges, which an electric field generated by a high bias voltage conducts to given electrodes. The number of created charges is proportional to the energy of the radiation photon that generated them. As the charges are gathered on the electrodes, they momentarily change the potential of said electrodes in proportion to the number of charges in question. By measuring the strength of the potential change of the electrode, there is obtained an electric signal with an amplitude that is proportional to the number of charges created in the medium, and consequently proportional to the energy of the fluorescence photon to be measured. The electric signals are collected by a multichannel analyzer that calculates the numbers of the signals representing various energies and thus creates a radiation spectrum where the location of each peak on the energy scale indicates the presence of a given element in the sample, and the relative height of each peak corresponds to the content of said element in the sample.

An ionization chamber and a proportional counter are types of gas-filled detectors, and the main difference between them is whether on the electrodes there is collected only the charge created immediately due to the interaction between the atoms (ionization chamber) or whether there is utilized a so-called gas amplification, i.e. the multiplication of free charges, as the released electrons ionize more and more new atoms of the medium (proportional counter). In particular, the present invention is meant to be used in proportional counters, but the same principle can also be applied to ionization chambers.

FIG. 1 is a schematical illustration showing the cross-section of a known tubular, gas-filled proportional counter. This type of proportional counter can be used for instance as a detector for X-ray fluorescence photons, when the energy of the fluorescence photons is of the order of a few kilo-electronvolts. The detector comprises a cylindrical shell 101 that is at both ends sealed with two parallel planes that are perpendicular to the central axis of the shell 101. The created closed space contains gas. The shell 101 is provided with a window 102 that is permeable to X-rays, and the X-ray photons to be measured enter the detector through said window. In the middle of the cylindrical space defined by the shell 101, there proceeds an anode wire 103 in parallel with the central axis of the shell 101, extending from one plane defining the detector space to the other plane. The shell 101 and the anode wire 103 are made of electroconductive material, and they are insulated from each other. The positive pole of the high-voltage source 104 is coupled via the resistor 105 to the anode wire 103, and the negative pole is coupled to the shell 101. From between the resistor 105 and the anode wire 103, there is provided a connection via a condensator 106 to the measurement signal output 107, from where the measurement signals can be conducted through an amplifier to a multichannel analyzer (not illustrated in the drawing).

When a fluorescence photon 110 enters the detector through the window 102, the most probable interaction with the gas serving as the medium is a photoelectric effect, i.e. the dislocation of a so-called photoelectron from one of the medium atoms. The obtained energy for a free photoelectron is the energy of the photon that dislocated it minus the binding energy that is required for dislocating the electron from the atom. The photoelectron proceeds in the medium for a certain distance 111, along which it interacts with other atoms, thus dislocating their outermost electrons, which generates a number of free charges in the medium. If we assume that we study the fluorescence radiation from sulfur, the energy of a fluorescence photon 110 is about 2.3 keV, and the proceeding distance 111 of a photoelectron is about 1–3 mm. The electric field between the anode wire 103 and the shell 101 conducts the created free electrons onto the anode, in which case the size of the negative charge pulse received by the anode is proportional to the energy of the photon that dislocated the original photoelectron.

In practical fluorescence measurements it has been observed that in addition to the fluorescence photons 110 proper, the detector is stricken by coherent photons scattered from the sample, and photons created by Compton scattering. It is known that the energy of excitation radiation can be chosen so that the energy of scattered radiation photons is higher than that of fluorescence photons, in which case the scattered photons as such are not mixed with the fluorescence photons to be measured. However, the problem is a so-called incomplete charge collection. It means that a scattered high-energy photon 112 dislocates a photoelectron which owing to its energy could proceed the distance 113, but collides in the shell 101 before it has donated all of its energy by ionizing the medium atoms. A partial trip of a high-energy photoelectron through the medium leaves a number of charges, the magnitude of which corresponds to only part of the original energy of the photon. If the number of said charges happens to be equal to the number of charges created by a fluorescence photon with a given energy, the scattered high-energy photon is erroneously calculated as a fluorescence photon. In any case, the magnitude of an incompletely collected charge is not bound to any defined state of energy typical of a given atom, due to which the collecting of an incomplete charge causes low-energy background noise in the measurement results, which background noise is continuously valued with respect to energy. With low contents of desired elements, it limits the sensitivity of the fluorescence analysis, because in the measurement channels representing the desired photon energies, the statistical distribution of the pulses is defined on the basis of the distribution of the background noise.

The collision of a photoelectron in the detector wall and the resulting incomplete charge collection is called a wall effect. A high-energy photoelectron can also be created in the material of the window 102, when a scattered photon interacts with the window material. In that case the photoelectron donates at least part of its energy by interacting with the atoms of the window material, but it may also proceed through the window material into the detector, where it donates the rest of its energy by ionizing atoms of the medium and causing low-energy background noise.

Low-energy background noise is also created when a photon that has entered the detector is scattered to the end part of the detector before its interaction with a gas atom. In the end part of the detector, the electric field between the electrodes is weaker than near the lengthwise center point of the detector, which decreases the gas amplification, i.e. reduces the number of those charges that are collected on the electrodes as created by a radiation photon with a given energy. The reduction of the electric field towards the end of the detector is a continuously valued function, due to which also the weakening of the gas amplification is continuously valued. This explains why continuously valued low-energy background noise is also created by the weaker electric field located in the end parts.

In the publication M-L. Järvinen, H. Sipilä: "Wall Effect and Detection Limit of the Proportional Counter Spectrometer", Advances in X-Ray Analysis, Vol. 27, pp. 539–546, Plenum Publishing Corporation, 1984, for eliminating low-energy background noise there is suggested, among others, a rise time analysis, i.e. the utilization of the known feature of measurement pulses where an ionization that takes place near the anode wire changes the anode potential sharper than an ionization taking place far from the anode wire, near the detector wall. The same publication also suggests that the excitation radiation is pulsed and that measurement signals are accepted only in a certain time window after the excitation pulse. However, practical experiments have shown that because the discrimination between an acceptable and a non-acceptable pulse must be carried out during such a stretch of the rise time or arrival time distribution where the derivative of the distribution is high (i.e. where the changing of the measured feature as a function of the number of the measurement pulses is strong), the results obtained from these methods are sensitive to occasional alterations. The conclusion in the above mentioned publication is that in order to reduce low-energy background noise, it is important to choose the right filling gas.

The object of the present invention is to set forth a detector and a measurement method where the signal to noise ratio of the measurement is improved by reducing the effect of continuously valued low-energy background noise.

The objects of the invention are achieved by building in the detector two detector spaces that are suitably located with respect to each other, the first of which generates the measurement pulses proper, and by ignoring such measurement pulses that occur simultaneously with a coincidence pulse obtained from the second detector space. Another factor towards achieving the objects of the invention is the reduction of the effective distance between the electrodes in those parts of the detector where the electric field would naturally be weaker.

The detector according to the invention is characterized by what is set forth in the characterizing part of the independent claim referring to the detector.

The invention also relates to an arrangement that is characterized by what is set forth in the characterizing part of the independent claim referring to the arrangement.

In addition, the invention relates to a method characterized by what is set forth in the characterizing part of the independent claim referring to the method.

As is well known, an incomplete charge collection is due to the fact that a photon colliding in the detector creates a photoelectron that does not ionize the detector medium with all of its energy, but donates an unknown amount of energy to the detector wall or window. According to the invention, there is produced a yes/no-type indication as to whether the whole detected ionization has taken place in the "feasible" area of the detector or not. In practice this is done by building in the detector two separate detector spaces that generate pulses irrespective of each other, being located so that the second detector space separates the first detector space from those parts of the detector that may cause wall effect. Only such photoelectrons whose whole energy is not absorbed in the first detector space proceed into the second detector space.

The pulses generated by the first detector space are called measurement pulses. From the point of view of energy dispersivity, it is necessary that the magnitude of the measurement pulse generated by the detector is proportional to the amount of energy that was absorbed in the first detector space, i.e. created charges therein. The pulses generated by the second detector space are called coincidence pulses, and they need not be proportional to the energy that was absorbed in the second measurement area: from the point of view of the measurement, it suffices that the coincidence pulse tells that a given photoelectron caused ionization also in the second measurement area. When the detector generates a coincidence pulse simultaneously with a given measurement pulse, said measurement pulse must be ignored when forming the spectrum proper to be created, because a simultaneous coincidence pulse tells that the measurement pulse does not contain the whole truth of the energy of the photon that created it.

In a tubular gas-filled detector, the principle of the invention is most advantageously realized coaxially, so that the first detector space is cylindrical and located in the middle of the detector, and that the second detector space is toroid-shaped and located around the first detector space. The detector spaces are separated by a tubular wall that is coaxial with the center axis of the detector and is constructed of wires, net or other structure that is easily permeable to electromagnetic radiation. Thus the first detector space is left inside said wall, and the second detector space is left between said wall and the outer wall of the detector. According to a known structural principle, the first detector space includes at least one anode. In order to secure that also the second detector space generates pulses, it must likewise be provided with an anode. Advantageously the anode of the second detector space is made of a net or a number of wires that pass through the second detector space between the wall and the outer wall of the detector. In order to ensure that the wall provided between the detector spaces should functionally separate said detector spaces, it must be made of an electroconductive material and coupled to a given potential other than the anode potential, most advantageously to earth potential.

In the operation of the measurement arrangement relating to measurement and coincidence pulses, the most important thing from the point of view of the invention is to observe the simultaneous occurrence of the pulses. The signals composed of measurement pulses and coincidence pulses are most advantageously conducted through two separate amplification and detector couplings to an analyzer, the most important task whereof is to collect signals composed of measurement pulses and to record them in the form of a spectrum. In addition, the analyzer is arranged to observe the simultaneous occurrence of signals arriving through said two separate amplification and detector couplings and to reject those pulses with which there is simultaneously created a coincidence pulse.

Low-energy background noise created due to the weakening of the electric field can be avoided by observing that the intensity of the electric field depends, apart from the potential difference of the electrodes, also on the distance between them. The distance between the electrodes can be reduced in those parts of the detector where the electric field should otherwise be weaker. In a tubular detector, this can be realized by providing the end parts of the detector with annular electroconductive elements that in the end parts reduce the effective diameter of the detector.

Figure 2:
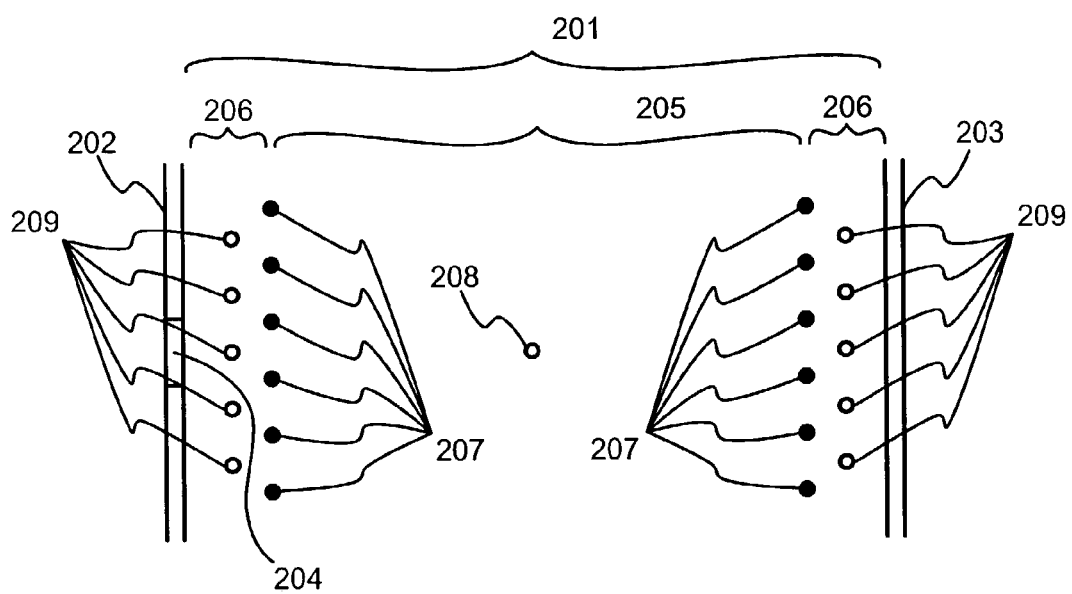
Figure 3A:
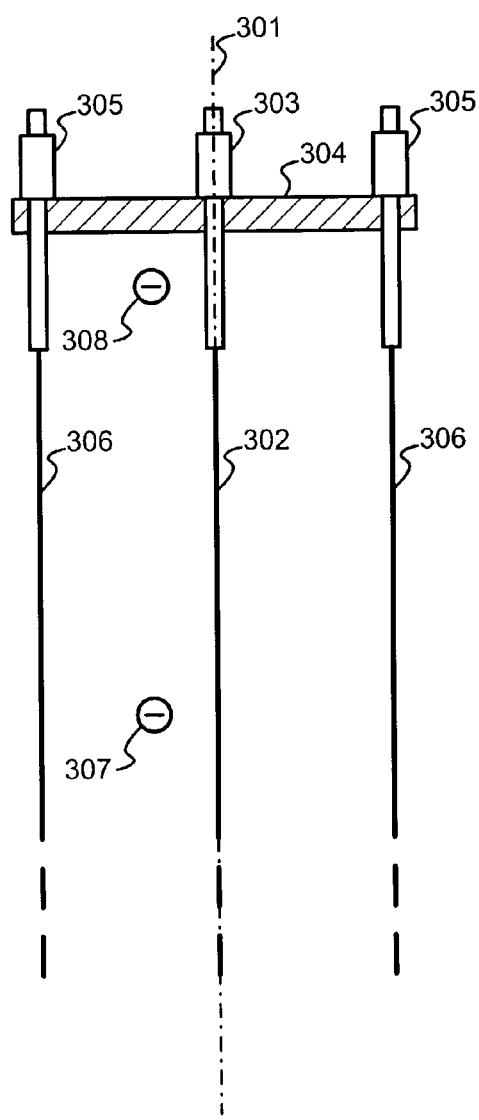
Figure 3B:
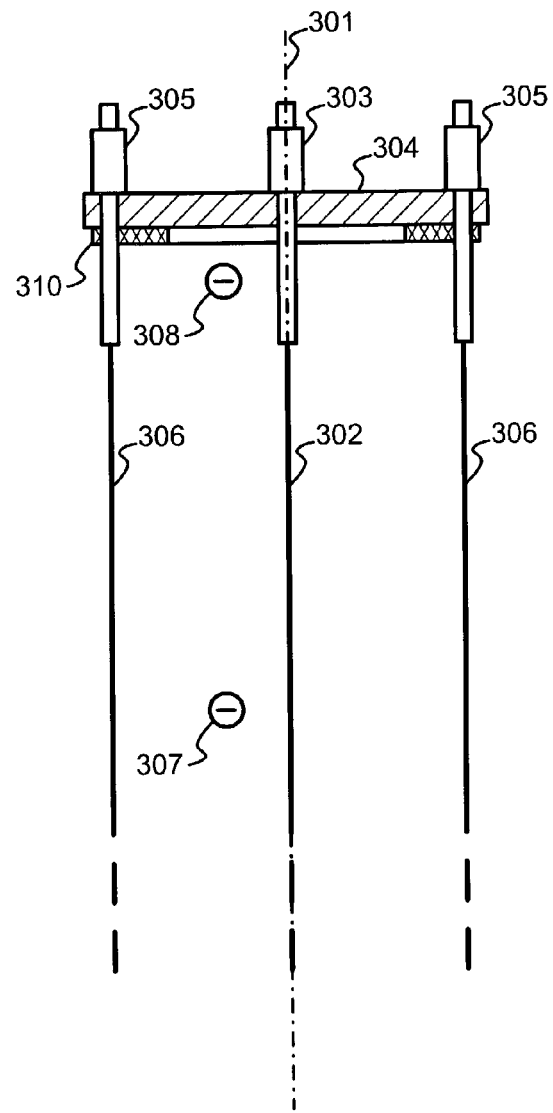
Figure 4:
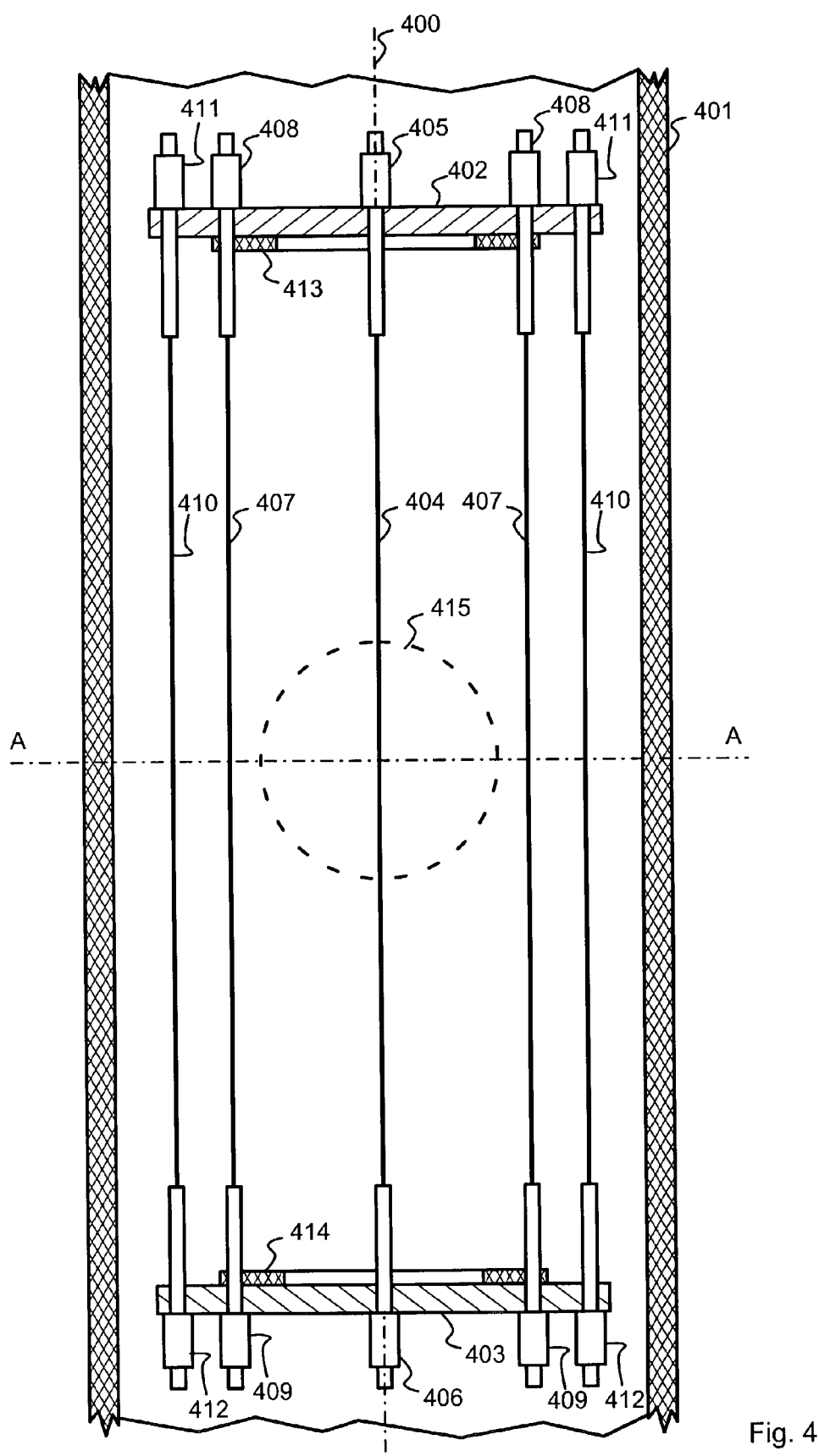
Figure 5:
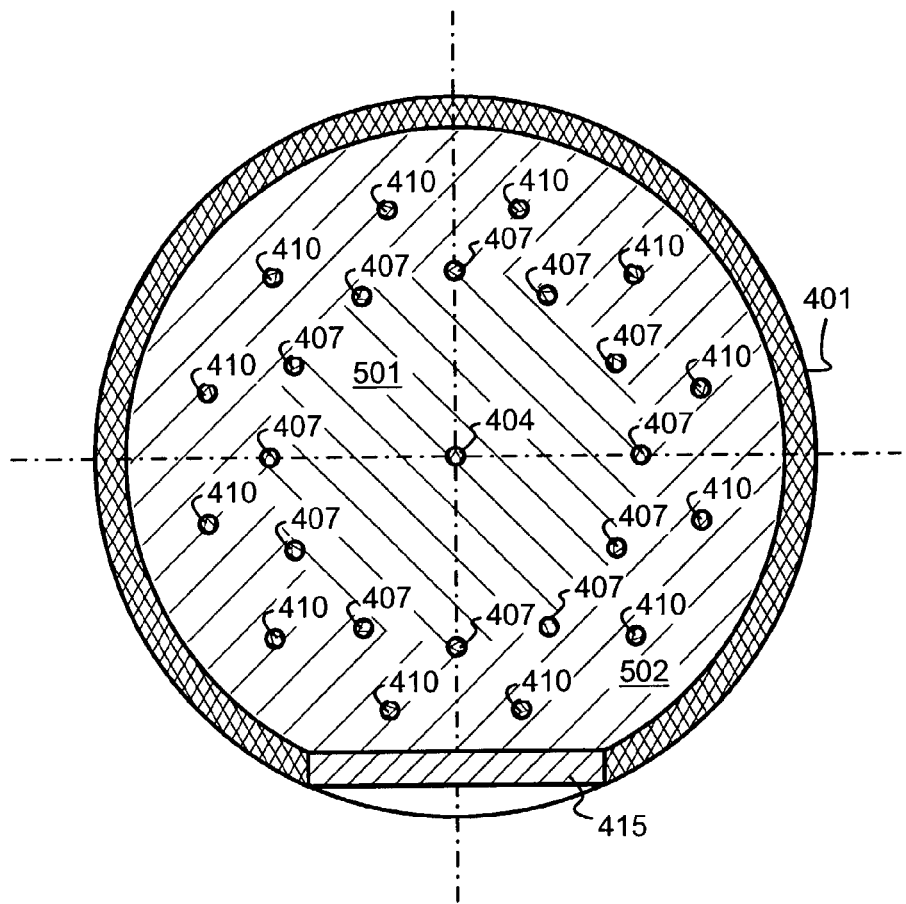
Figure 6:
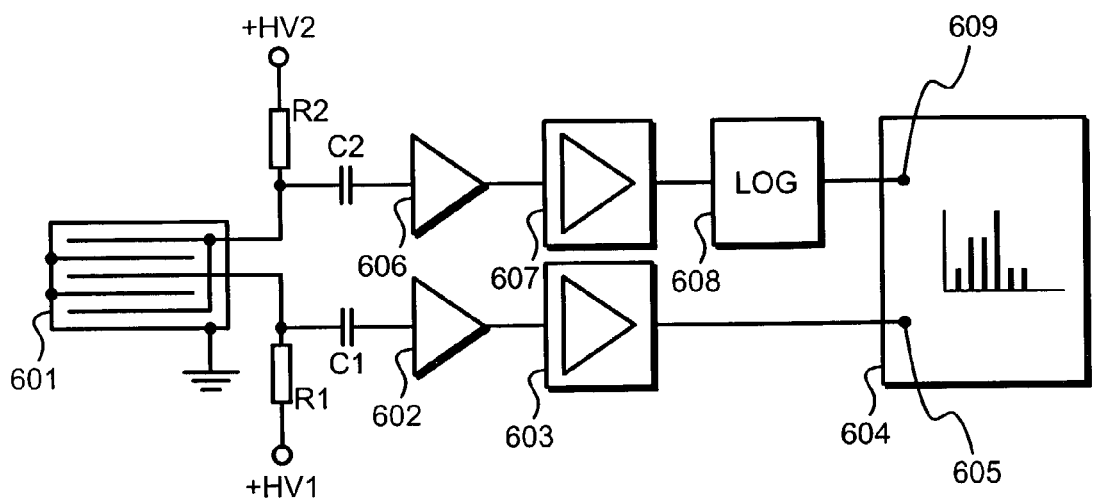
Figure 7:
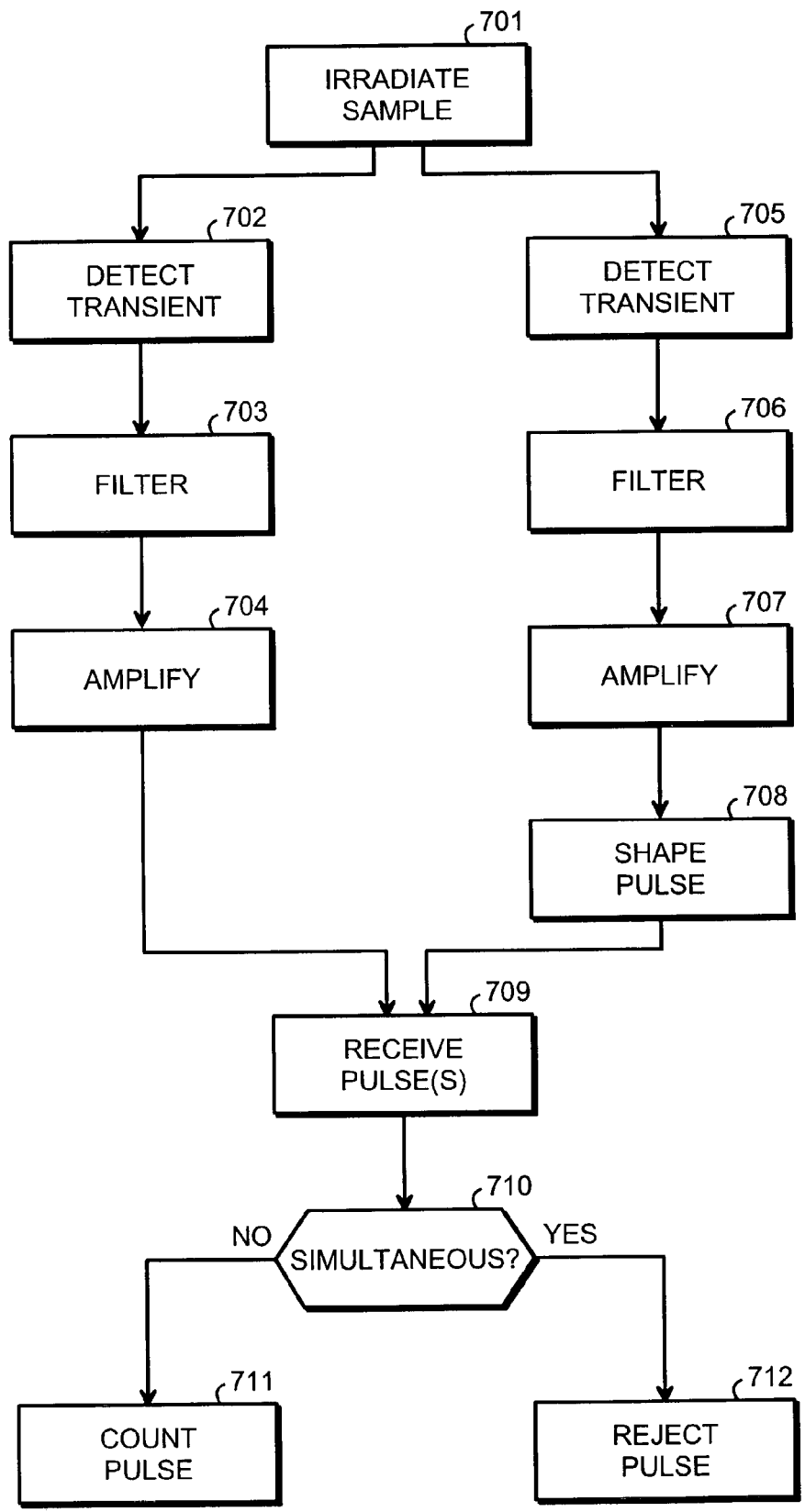

The invention is described in more detail below with reference to the preferred embodiments, illustrated by way of example, and to the appended drawings, where FIG. 1 illustrates a cross-section of a prior-art tubular detector, FIG. 2 illustrates the principle of operation of the detector according to the invention, FIGS. 3a and 3b illustrate the principle according to a preferred embodiment of the invention for reducing low-energy background noise, FIG. 4 illustrates a part of a preferred embodiment of the invention, FIG. 5 illustrates the cross-section of a detector according to FIG. 4, FIG. 6 illustrates an arrangement according to a preferred embodiment of the invention, and FIG. 7 illustrates a method according to a preferred embodiment of the invention.

Above, in connection with the description of the prior art, FIG. 1 was already dealt with; below, in the description of the invention and its preferred embodiments, mainly FIGS. 2–7 are referred to. Like numbers for like parts are used in the drawings. In this patent application, the word 'comprise' is used as an open term that does not exclude the possibility that the described structure should also include other elements. The additional features of the invention, described in the dependent claims, can bee freely combined unless it is specifically said otherwise. It is not the purpose of the exemplary preferred embodiments of the invention to restrict the scope of the claims set forth below.

FIG. 2 illustrates the functional principle of a detector according to a preferred embodiment of the invention, which principle aims at detecting that a given measurement pulse was created as a result of the collection of an incomplete charge. A gas-filled detector 201 of X-ray fluorescence photons is defined by the outer walls 202 and 203, the first of which includes a window 204 for letting the photons to be measured in the detector 201. The detector 201 is divided into two detector spaces 205 and 206, the second 206 of which separates the first detector space 205 from the detector walls 202 and 203 and from the window 204. The detector spaces 205 and 206 are separated by a wall 207 that has no remarkable interaction cross-section with the X-ray photons. The first detector space 205 comprises at least one anode 208, and the second detector space 206 also comprises at least one anode 209. The potential of the wall 207 differs remarkably from the potential of the anodes 208 and 209. Typically the anodes 208 and 209 have a given high positive potential, not necessarily mutually similar, whereas the wall 207 and the outer walls 202 and 203 defining the detector have earth potential.

The principle of operation illustrated in FIG. 2 is based on the fact that the first detector space 205 is sufficiently wide and the properties of the medium provided therein are such that the whole energy of the X-ray fluorescence photons that are energywise interesting is at a high probability absorbed in the first detector space 205. On the other hand, the dimensions and properties of the second detector space 206 are designed so that the probability of an interesting X-ray fluorescence photon entering the detector to cause a photoelectric phenomenon already when it passes through the second detector space 206 immediately succeeding the window 204 is small. Thus, when an X-ray fluorescence photon of the desired type enters through the window 204, it interacts at a high probability with the medium provided in the first detector space 205, thus generating a number of free charges. The number of the created free charges is proportional to the energy that the photon had when it penetrated the window 204. The electric field between the anode 208 and the wall 207 serving as the cathode conducts the free negative charges to the anode 208, so that the measuring circuit (not illustrated) observing the anode potential detects an oscillation in the potential of the anode 208, and on the basis of said oscillation, there is generated a measurement pulse. According to the known principle of operation of the proportional counter, the magnitude of the measurement pulse is proportional to the number of charges collected on the anode 208, i.e. to the energy of the detected X-ray fluorescence photon.

In the electric field, positive free charges are driven towards the cathodes, wherefore it could in theory be possible to generate a measurement pulse also by observing oscillations in the cathode potential. However, in practice structural factors and the superior mobility of electrodes in comparison with positive ions result in that in a feasible practical solution, the measurement pulses are generated from the anode potential. The measuring of the cathode potential is mainly used in semiconductor detectors where the difference between the mobility of the electrodes and the holes is less dramatic.

If a scattered high-energy photon enters the detector 201 through the window 204, it creates a photoelectron in the first detector space 205 in similar fashion as the desired X-ray fluorescence photons. The energy of a high-energy photoelectron can be so high that it is not completely absorbed in an ionizing interaction with the medium of the first detector space 205, but the photoelectron proceeds through the wall 207 as far as the second detector space 206. It also interacts with the medium of the second detector space 206, thus creating free charges. Also the second detector space 206 has an electric field conducting free charges, which electric field tends to draw the negative charges created in the second detector space 206 onto the anodes 209. By observing the potential of the anodes 209, it is possible to create pulses in exactly the same way as was explained above, with respect to the first detector space. In this patent application, said pulses are called coincidence pulses.

As a result of the interaction between a photoelectron created of a high-energy photon and the medium provided in the detector 201, there are generated both a measurement pulse and a coincidence pulse that are timewise generated practically simultaneously: in typical practical solutions, the dimensions of the detector are of the order of a few millimeters, or tens of centimeters at the most, wherefore the proceeding delay of a photoelectron between the first and second detector space can be ignored. Delays are mainly created in the operation of the measurement electronics, so that in order to maintain the simultaneous nature of the measurement pulse and the coincidence pulse generated by the high-energy photon, it must be made sure that in the branches of measurement electronics (not illustrated) dealing with the measurement and coincidence pulses, the delays are equally long with an optimal accuracy.

The small interaction cross-section of the wall 207 with the photoelectrons is an important presupposition for a correct operation of the detector, in order to prevent the photoelectron created of a high-energy photon from being absorbed in the wall 207 after proceeding through the first detector space 205. The small interaction cross-section can be created in many ways known as such. Because the task of the wall 207 is mainly related to the creation of the electric field, it is most advantageously composed of a net or separate wires, between which there is arranged a direct connection from the first detector space 205 to the second detector space 206.

FIGS. 3a and 3b illustrate a structural principle according to another preferred embodiment of the invention; the application of this principle in a gas-filled X-ray fluorescence radiation detector reduces low-energy background noise. FIG. 3a illustrates a part of a prior-art gas-filled detector. The detector is cylindrically symmetrical with respect to the central axis 301, and it is provided with an anode wire 302 located on the central axis 301, which anode wire 302 is at the end attached to an insulation board 304 by intermediation of a fastening element 303. The insulation board 304 is round and positioned at right angles to the central axis 301. On the outer circumference thereof, there are arranged several fastening elements 305 of the cathode wires, which fastening elements 305 together with the anode wire 302 secure the parallel cathode wires 306 in place. The other end of the detector is provided with a corresponding insulation board and corresponding fastening elements for the anode and cathode wires (not illustrated). The central axis 301 of the detector can also be called its longitudinal axis.

With respect to the longitudinal axis of the detector, the free negative charge 307 is located near the middle, i.e. relatively far from the detector ends. It is subjected to a force that pulls it towards the anode wire 302. The magnitude of the pulling force is directly proportional to the magnitude of the charge 307 and to the electric field prevailing in the location thereof. The latter can be calculated; in a possible calculation method, the whole lengths of the anode wire 302 and the cathode wires 306 are divided into differentially small units of length, there is written a vector clause for the electric field that one of these length units creates in the location of the free charge 307, and there is calculated a vector integral over the lengths of the anode and cathode wires. In the center region of the detector, the calculation of the electric field can be simplified by assuming that the end parts of the detector have a relatively small effect in the electric field, in which case the Laplace's equation used for solving the electric field can be written in cylinder coordinates, where the share of the axial component (the z component) is ignored.

The free negative charge 308 is otherwise similar to the charge 307, but it is located near to the end of the detector. It is likewise subjected to a force that pulls it towards the anode wire 302. If, however, the electric field at the location of the charge 308 is calculated, it is found out that said electric field—and likewise the force directed to the charge 308—is smaller than in the location of the charges 307. It can be assumed that the reason for this is the fact that the differentially small length units of the anode and cathode wires that create the electric field are, when seen from the location of the charge 308, mainly located on the same level and below it, whereas the electric field of the location of the charge 307 is affected by the length units of the anode and cathode wires located both above and below. In the operation of the detector, a lower value of the electric field in the location of the charge 308 results in a component of low-energy background noise, as was already explained in connection with the description of the prior art.

One solution, obvious as such, for reducing low-energy background noise caused by said reason could be to make the detector longer, in which case the relative proportion of the photons that are scattered as far as the end parts of the detector would remain smaller owing to geometric reasons. However, the lengthening of the detector increases production expenses and makes the ready-made detector more cumbersome to deal with. As regards for instance detectors to be installed in satellites, there are often set strict requirements for maximum size.

FIG. 3b illustrates a part of a detector that is otherwise similar, but according to a preferred embodiment of the invention, in the insulation board 304 provided at the end of the detector, there is attached an annular plate 310 made of an electroconductive material, which plate is concentric with the insulation board 304 and with the anode wire 302 and has the same potential as the cathode wires 306. Due to the effect of the conductor ring 310, the charge 308 prevailing near the end of the detector now experiences a stronger electric field and thus a stronger force pulling towards the anode wire 302 than in FIG. 3a, because the difference between the anode and cathode potential is the same but the distance between the conductor ring 310 and the anode wire 302 is shorter than the distance between the cathode wires 306 and the anode wire 302. The principle illustrated in FIG. 3b can be generalized by saying that in the detector, the distance between the electroconductive objects with anode and cathode potentials can be made smaller than in the rest of the detector at such extreme points where the restricted dimensions of the electroconductive objects with anode and cathode potentials in a given direction would otherwise make the electric field prevailing therebetween weaker than in locations further away from said extreme points.

FIG. 4 illustrates a detector according to a preferred embodiment of the invention in a partial cross-section. The detector is essentially cylindrically symmetric with respect to its geometrical central axis 400. The detector housing is formed by a tube 401, circular in cross-section, which tube is coaxial with the central axis 400. The material and wall thickness of the tube are chosen so that X-ray photons do not generally penetrate the walls of the tube 401. Inside the tube, there are arranged two circular insulation boards 402 and 403 that are coaxial with the tube and have an outer diameter that is equal or somewhat smaller than the inner diameter of the tube 401, said insulation boards 402 and 403 being positioned at right angles against the central axis 401. The insulation boards 402 and 403 are secured in place inside the tube 401 in some way known as such. The space between the insulation boards 402 and 403 is the active space of the detector, where the detection proper of the radiation photons takes place. In FIG. 4, the length of the active space, i.e. the distance between the insulation boards 402 and 403, is for the sake of graphical clarity illustrated as shorter than a typical practical application: in a real detector, the distance between the insulation boards 402 and 403 is typically about four times the inner diameter of the tube 401.

The central points of the insulation boards 402 and 403 are connected by an anode wire 404 located on the central axis 401, which anode wire is at the ends supported against the insulation boards 402 and 403 by fastening elements 405 and 406. In addition to the anode wire 404, the detector comprises, between the insulation boards 402 and 403, two rings of other wires in parallel with the anode wire 404. The inner ring comprises cathode wires 407 that are at the ends supported against the insulation boards 402 and 403 with fastening elements 408 and 409. The outer ring comprises coincidence anode wires 410 that are at the ends supported against the insulation boards 402 and 403 with fastening elements 411 and 412. Moreover, in the insulation boards there are attached annular elements 413 and 414 leading to the active space of the detector. In the wall of the tube 401, in the center of the active space, there is arranged a window that is well permeable to X-ray photons with the desired fluorescence energies.

FIG. 5 shows the detector of FIG. 4 in a cross-section along the line A—A. In FIG. 5 it is seen how the cathode wires 407 and the coincidence anode wires 410 form two nested, coaxial rings around the anode wire 404. When the structure illustrated in FIG. 5 is compared with the principle of operation illustrated in FIG. 2, the first detector space 501 in FIG. 5 can be the area, circular in cross-section, that is left inside the ring defined by the cathode wires 407. In FIG. 5, it is marked with lines that are inclined diagonally to the right. The second detector space 502 is annular in cross-section, and it is restricted on the inside by the ring defined by the cathode wires 407, and on the outside by the inner surface of the tube 401 and of the window 415. In the drawing, the second detector space 502 is marked with lines that are inclined to the left. The separate cathode wires 407 could be replaced by a cylindrical cathode net placed in the same spot. Likewise, the separate coincidence anode wires 410 could be replaced by a cylindrical coincidence cathode net placed in the same spot.

For the sake of graphical clarity, FIGS. 4 and 5 exaggerate the relative distances between the inner surface of the tube 401 and the ring formed by the coincidence anode wires 410, and between the latter ring and the ring formed by the cathode wires 407. In a typical gas-filled detector, where the diameter of the tube 401 is of the order 30–40 mm, said distances are both of the order 1–2 mm. The selection of said distances is affected, among other things, by the length of the distance that a photoelectron dislocated by the desired type of X-ray fluorescence photon typically proceeds inside the detector. The thickness of the second detector space, i.e. the distance between the ring formed by the cathode wires 407 and the inner surface of the tube 401, should not be chosen to be much longer than the typical proceeding distance of a photoelectron dislocated by an X-ray fluorescence photon. By following this recommendation, there is avoided the unnecessary rejection of such measurement pulses that were originated from a photoelectron dislocated by an X-ray fluorescence photon in the vicinity of the ring formed by the cathode wires 407, in which pulses the photoelectron started proceeding towards the inner surface of the tube 401.

The wires that in the structure illustrated by FIGS. 4 and 5 are used as anodes and cathodes constitute mechanical obstacles for the photoelectrons, and thus result in an incomplete collection of the charge, if the photoelectron strikes them before its whole energy is absorbed in the medium. Therefore it is most advantageous to make the wires as thin as possible. During the experimental work that lead to this invention, there was used a detector where the distance between the insulation boards 402 and 403 was about 15 cm, the inner diameter of the tube was about 36 mm, and the thickness of the wires 404, 407 and 410 was 13 micrometers. As for the second detector space, there are typically 8–16 anode wires 410 placed at equal distances, and the number of cathode wires 407 is 1–3 times the number of the anode wires 410.

In order to make the structure illustrated in FIGS. 4 and 5 to function as a detector, the tube 401 must be sealed at both ends so that it is impermeable to gas, and it must contain a suitable detector filler gas. In addition, the detector must comprise means for coupling the tube 401 and the cathode wires 407 as well as the annular elements 413 and 414 to earth potential (or to another desired cathode potential), and for coupling the anode wire 404 and the coincidence anode wires 410 to desired anode potentials that are more positive than the cathode potential. In practice, the realization of these features only requires the application of known technology, and the practical application is not significant from the point of view of the present invention.

FIG. 6 illustrates a measurement arrangement according to a preferred embodiment of the invention. This measurement arrangement comprises a detector 601 placed so that it can receive X-ray fluorescence photons. The anode or anodes provided in the detector 601 are coupled, via a resistor R1, to a positive anode potential +HV1. The coincidence anode or anodes provided in the detector 601 are coupled, via a resistor R2, to another positive anode potential +HV2. The shell of the detector 601 and the cathode or cathodes provided in the detector 601 are coupled to earth potential or more generally to the cathode potential.

From between the anode and the resistor R1, there is arranged a coupling via a separation condensator C1 to a low-noise preamplifier 602, and further via a linear amplifier 603 to the signal input 605 of a multichannel analyzer 604. Between the coincidence anodes and the resistor R2, there is provided a coupling via a separation condensator C2 to the specific, low-noise preamplifier 606 pertaining to the coincidence signal processing route, and further via a linear amplifier 607 and a logics unit 608 to the coincidence input 609 of the multichannel analyzer 604.

The measurement signal processing route shown in the lower part of the arrangement illustrated in FIG. 6 is not significantly different from the known method for processing the signals generated by a gas-filled, energy-dispersive X-ray detector. As a default value, the anode potential +HV1 keeps the anode of the detector 601 at a given potential that is remarkably more positive than that of the cathode. When an X-ray photon is detected in the detector, i.e. when the anode is suddenly hit by a burst of negative charges, a rapid change takes place in the anode potential, and said change is transmitted, via the separation condensator C1 serving as a high-pass filter, as a voltage-form input signal to a low-noise preamplifier 602 that amplifies the signal and transmits it to a linear amplifier 603. There the pulse-form signal is further amplified prior to feeding it to the measurement signal input 605 of the multichannel analyzer 604. The multichannel analyzer 604 measures the level of the amplified signal pulse and decides on the basis thereof to which measurement bin the detected pulse belongs. On the basis of its decision-making process, the multichannel analyzer increases the number of the detected pulses in said bin.

The coincidence pulse processing route illustrated in the upper part of FIG. 6 aims at detecting the collection of an incomplete pulse and at eliminating the corresponding low-energy background noise according to the method of the invention. As a default value, the anode potential +HV2 keeps the coincidence anodes of the detector 601 at a given potential that is remarkably more positive than the cathode potential. When an X-ray photon is detected in the second detector space of the detector 601, i.e. when a sudden burst of negative charges strikes the coincidence anode, a rapid change takes place in the potential of the coincidence anode, which change is transmitted via the separation condensator C2 serving as a high-pass filter as a voltage-form input signal to the low-noise preamplifier 606 that amplifies the signal and sends it to the linear amplifier 607. There the pulse-form signal is further amplified; after that, however, the amplified signal is not directly fed to the multichannel analyzer 604, but to the logics unit 608. Its task is to check whether the level of the detected pulse was such that it really indicated an observation relating to the collection of an incomplete charge in the second detector space. In a positive case, the logics unit generates a coincidence pulse, the level and duration of which are most advantageously adjustable in order to adjust the operation of the logics unit 608 in an optimal fashion with the operation of the multichannel analyzer 604. The coincidence pulse generated by the logics unit 608 is conducted to the coincidence input 609 of the multichannel analyzer 604. The multichannel analyzer 604 is programmed so that in case it simultaneously receives a pulse both in the measurement signal input 605 and in the coincidence input 609, it ignores the pulse received in the measurement signal input 605.

The coincidence signal processing chain (+HV2, R2, C2, 606, 607, 608, 609) is not subjected to similar linearity requirements as the measurement signal processing chain (+HV1, R1, C1, 602, 603, 605), because by nature the coincidence detection represents the yes/no type. The essential point for the coincidence detection is the functionality represented by the logics unit 608, i.e. evaluating which phenomenon detected in the second detector space of the detector 601 was connected to an ionization caused by a photoelectron and which was not. In order to make this evaluation as reliable as possible, it is generally recommendable that the potential +HV2 of the coincidence anodes is selected fairly high. Likewise, the amplification coefficients of the amplifiers 606 and 607 can be larger than in the measurement signal processing chain, where the selection of the anode potential +HV1 proper and the amplification coefficients of the amplifiers 602 and 603 is mainly determined by the requirement for a linear detection with respect to the photon energy.

FIG. 7 is a schematical illustration of the measurement method according to a preferred embodiment of the invention. In step 701, the sample is irradiated by suitable excitation radiation. The production of the measurement pulses and the coincidence pulses takes place independently, which is indicated in the method so that irradiation is followed by (i.e. during the irradiation there are carried out) two simultaneous but independent detection steps. The measurement pulses are originated in the detection step 702, and they are filtered and amplified in steps 703 and 704. The coincidence pulses are originated in the detection step 705, and they are filtered and amplified in steps 706 and 707. In step 708, the coincidence pulses are shaped, which in general means that a coincidence pulse of a suitable level and duration is generated as a response to a decision according to which a given observation made in step 705 indicated an ionization caused by a photoelectron in the second detector space. In step 709, there are received pulses from the processing chains of both measurement and coincidence pulses. In step 710 it is checked whether given two pulses were received simultaneously from these chains. If the answer is negative, the pulse received from the measurement pulse processing chain is in step 711 included in the formation of a fluorescence spectrum. If the pulses were detected in step 710 to be simultaneous, the pulse received from the measurement pulse processing chain is rejected in step 712. Such possible pulses that were only received from the coincidence pulse processing chain, without a detected simultaneous measurement pulse, do not require measures to be taken.

In practical measurements it has been observed that the arrangement according to FIG. 6 and the method according to FIG. 7 improve the signal to noise ratio with low-energy background noise even up to 15–50 times as compared with a measurement arrangement where the collection of an incomplete charge is not taken into account. Naturally the using of the second detector space, according to the invention, in order to insulate the proper (first) detector space from surfaces causing wall effect also results in a certain amount of unnecessary rejection of proper measurement pulses in cases where a desired type of X-ray fluorescence quantum dislocated a photoelectron in the immediate vicinity of the wall separating the measurement spaces, i.e. when a photoelectron ionized the medium in both measurement spaces without striking the outer wall of the detector. However, these unnecessary rejections of measurement pulses can be minimized by a correct design of the dimensions of the detector. In addition, the detector and the measurement arrangement are in any case calibrated by means of the contents of known target elements, and consequently unnecessary rejections of measurement pulses cannot distort the final measurement result.

What is claimed is:

1. A radiation detector for energy-dispersive detection of X-ray photons, comprising
   gaseous medium in a given space for generating free charges as a response to the interaction of an X-ray photon with said medium,
   an outer wall defining said space, and
   electrodes for collecting the generated free charges in order to realize an indication relating to a detected X-ray photon;
   wherein:
   said space comprises a first detector subspace and a second detector subspace and a wall of net or wires between said first detector subspace and said second detector subspace, wherein said wall of net or wires encircles said first subspace and is adapted to be coupled to a cathode potential,
   the second detector subspace separates the first detector subspace from the outer wall defining said space, and
   the radiation detector comprises a first anode for collecting free charges in the first detector subspace and a second anode for collecting free charges in the second detector subspace, said first and second anodes being adapted to be coupled to anode potentials that are more positive than said cathode potential.

2. A radiation detector according to claim 1, wherein:
   said space is defined by the outer wall defining a cylindrical outer surface and a first end and a second end located at right angles to the longitudinal direction of the cylindrical outer surface,
   the shape of the first detector subspace is a full cylinder that is located between the first end and the second end, inside the cylindrical outer surface and coaxially therewith,
   the second detector subspace is generally tubular and is located between the first end and the second end, between the first detector subspace and the cylindrical outer surface coaxially with them, and the cylindrical outer surface is provided with a window that is permeable to X-ray radiation, located in the middle of the distance left between the first end and the second end.

3. A radiation detector according to claim 2, wherein inside the cylindrical outer surface, the first end and the second end are both provided with an annular element that is made of an electroconductive material and coupled to the same potential as the wall of net or wires.

4. A radiation detector according to claim 1, wherein the wall of net or wires is composed of a number of wires placed on a cylindrical envelope surface.

5. A radiation detector according to claim 1, wherein the wall of net or wires is composed of a net with a cylindrical shape.

6. A radiation detector according to claim 1, wherein the first anode is a wire that is placed coaxially with the first detector subspace.

7. A radiation detector according to claim 1, wherein the second anode is composed of a number of wires placed on a cylindrical envelope surface that is concentric with the second detector subspace and located at an equal distance both from the first detector subspace and from the outer wall.

8. A radiation detector according to claim 7, wherein the wall of net or wires is composed of a number of wires placed on a cylindrical envelope surface, the number of said wires being 1–3 times the number of the wires of the second anode.

9. A radiation detector according to claim 1, wherein the second anode is composed of a cylindrical net that is concentric with the second detector subspace and located at an equal distance both from the first detector subspace and from the outer wall.

10. An arrangement for an energy-dispersive detection of X-ray photons, comprising:
    a radiation detector and
    an apparatus for detecting the X-ray photons collided in the radiation detector;
    wherein:
    the radiation detector comprises a first detector subspace, a second detector subspace, a wall of net or wires and an outer wall defining the detector, arranged so that the second detector space separates the first detector subspace from the outer wall and the wall of net or wires encircles the first detector subspace and separates the first detector subspace from the second detector subspace,
    the apparatus comprises means for coupling the wall of net or wires to a cathode potential and for coupling a first anode located in the first detector subspace and a second anode located in the second detector subspace to anode potentials that are more positive than said cathode potential,
    the apparatus comprises means for detecting an X-ray photon collided in the first detector subspace and means for detecting an X-ray photon collided in the second detector subspace, and
    the apparatus is arranged to ignore the observations in the first detector subspace when there is received a simultaneous observation in the second detector subspace.

11. An arrangement according to claim 10, wherein:
    the means for detecting the X-ray photon that collided in the first detector subspace comprise a first processing chain that is arranged to convert a transient in the potential of the first anode into a pulse-form voltage signal with an amplitude that is proportional to the magnitude of the transient of the potential of the first anode,
    the means for detecting the X-ray photon that collided in the second detector subspace comprise a second processing chain that is arranged to convert a transient in the potential of the second anode into a pulse-form voltage signal, and
    the apparatus is arranged to ignore the pulse-form voltage signals generated by the first processing chain when there simultaneously occurs a pulse-form voltage signal generated by the second processing chain.

12. A method for an energy-dispersive detection of X-ray photons, comprising:
    allowing X-ray photons to enter a radiation detector and to interact with a medium enclosed in the radiation detector, and
    producing observations of the X-ray photons that entered the detector;
    wherein producing observations comprises:
    producing separately observations of X-ray photon caused interactions in a first detector subspace of the radiation detector and X-ray photon caused interactions in a second detector subspace of the radiation detector, and
    ignoring the observations of an interaction in the first detector subspace when there is received a simultaneous observation of an interaction in the second detector sub space.

* * * * *